(12) United States Patent
Yang

(10) Patent No.: US 11,299,238 B2
(45) Date of Patent: Apr. 12, 2022

(54) STRUCTURE FOR INTEGRATING DOWN TUBE OF ELECTRIC BICYCLE WITH BATTERY BOX

(71) Applicant: KUNSHAN SHINED DESIGN CO., LTD., Kunshan (CN)

(72) Inventor: Wenpin Yang, Kunshan (CN)

(73) Assignee: KUNSHAN SHINED DESIGN CO., LTD., Kunshan (CN)

( * ) Notice: Subject to any disclaimer, the term of this patent is extended or adjusted under 35 U.S.C. 154(b) by 0 days.

(21) Appl. No.: 17/298,604

(22) PCT Filed: Jan. 14, 2020

(86) PCT No.: PCT/CN2020/072099
§ 371 (c)(1),
(2) Date: May 31, 2021

(87) PCT Pub. No.: WO2020/147732
PCT Pub. Date: Jul. 23, 2020

(65) Prior Publication Data
US 2022/0024538 A1    Jan. 27, 2022

(30) Foreign Application Priority Data

Jan. 15, 2019 (CN) .......................... 201910035517.7

(51) Int. Cl.
*B62M 6/90* (2010.01)
*B60K 1/04* (2019.01)

(52) U.S. Cl.
CPC .................................... *B62M 6/90* (2013.01)

(58) Field of Classification Search
CPC .. B62M 6/90; B60K 1/04; B60L 50/50; B60L 50/60
See application file for complete search history.

(56) References Cited

U.S. PATENT DOCUMENTS

| 10,930,903 | B2* | 2/2021 | Mitsuyasu | ............ H01M 50/20 |
| 11,161,567 | B2* | 11/2021 | Eguchi | ..................... B62M 6/90 |
| 2016/0311494 | A1* | 10/2016 | Schliewert | ............. B62K 19/30 |

(Continued)

FOREIGN PATENT DOCUMENTS

| CN | 202624562 U | 12/2012 |
| CN | 203832691 U | 9/2014 |
| CN | 206856919 U | 1/2018 |

(Continued)

*Primary Examiner* — John D Walters
(74) *Attorney, Agent, or Firm* — Bayramoglu Law Offices LLC

(57) ABSTRACT

A structure for integrating a down tube of an electric bicycle with a battery box is provided. The down tube has a tube body and two fixed bases arranged in the inner cavity of the tube body. A receiving cavity is bounded by the two fixed bases and the tube body. The receiving cavity is provided with an access opening on the outer side surface of the tube body. A long side of the access opening extends inward to form an elongated protruding rib. A positioning column is provided on each of two opposite sides of the two fixed bases. The battery box has a box body and two bearing bases that are installed on the outer sides of the two ends of the box body, respectively. A first dimple is provided on the outer side of the box body in a concave manner.

7 Claims, 5 Drawing Sheets

(56) References Cited

U.S. PATENT DOCUMENTS

2019/0322332 A1\* 10/2019 Beistegui Chirapozu ................... B62M 6/40

FOREIGN PATENT DOCUMENTS

| CN | 207917076 U | 9/2018 |
| CN | 208045573 U | 11/2018 |
| CN | 109004125 A | 12/2018 |
| CN | 109572920 A | 4/2019 |
| CN | 209833895 U | 12/2019 |

\* cited by examiner

STRUCTURE FOR INTEGRATING DOWN TUBE OF ELECTRIC BICYCLE WITH BATTERY BOX

CROSS REFERENCE TO THE RELATED APPLICATIONS

This application is the national phase entry of International Application No. PCT/CN2020/072099, filed on Jan. 14, 2020, which is based upon and claims priority to Chinese Patent Application No. 201910035517.7, filed on Jan. 15, 2019, the entire contents of which are incorporated herein by reference.

TECHNICAL FIELD

The present invention relates to the technical field of electric bicycles, and more particularly, to a structure for integrating a down tube of an electric bicycle with a battery box.

BACKGROUND

The electric bicycle is highly preferred by the public as being a convenient and eco-friendly means of transportation. An electric bicycle is powered by a battery, installed thereon. In order to facilitate the removal of the battery from the electric bicycle for charging, existing batteries for electric bicycles are typically made to be removable. In the prior art, batteries are removably installed on electric bicycles typically by a vertical rotation method, in which the battery is placed in or removed from the down tube of the electric bicycle by means of vertical rotation. This vertical rotation method, however, poses higher requirements for the structure and size of the down tube, requiring an adequate clearance space reserved in the down tube for the placement of the battery. This requirement not only increases the difficulty of the production process, but also increases the size of the down tube, thereby diminishing the aesthetic appearance of the entire bicycle.

In view of the above, it is highly desirable to provide a structure for integrating a down tube of an electric bicycle with a battery box.

SUMMARY

In order to overcome the above-mentioned shortcomings, the present invention provides a structure for integrating a down tube of an electric bicycle with a battery box. This novel structure provides a unique operation mode and reduces the requirements for the structure and size of the down tube, thereby improving the aesthetic appearance of the entire bicycle.

The technical solutions adopted by the present invention for solving the technical problems are as follows. A structure for integrating a down tube of an electric bicycle with a battery box includes the down tube and the battery box. The down tube has a hollow straight tubular tube body and two fixed bases arranged in an inner cavity of the tube body at intervals along the lengthwise direction of the tube body. A receiving cavity is bounded by the two fixed bases and the inner cavity of the tube body. The receiving cavity is provided with an access opening on an outer side surface of the tube body. The access opening extends along the lengthwise direction of the tube body, and is configured to allow the battery box to be placed in the receiving cavity. A long side of the access opening extends inward to form an elongated protruding rib. In addition, a positioning column is integrally provided on each of two opposite sides of the two fixed bases.

The battery box has a straight tubular box body for receiving a battery cell and two bearing bases that are positioned and installed on the outer sides of the two ends of the box body in the lengthwise direction of the box body, respectively. A first dimple is provided on the outer side of the box body in a concave manner and extends along the lengthwise direction of the box body. A second dimple is provided on one side of each of the bearing bases in a concave manner. The two second dimples are connected to the two ends of the first dimple in the lengthwise direction of the first dimple through smooth transitions, respectively, to jointly constitute a rotating slot movably matched with the protruding rib. In addition, the two bearing bases correspondingly match the two fixed bases, respectively. An engaging slot is integrally formed on each of the bearing bases correspondingly, and is configured to be movably matched with the positioning column.

When an external force in a positive direction is applied to the battery box, the battery box rotates around the protruding rib as a rotation fulcrum in the positive direction relative to the receiving cavity, so that the two engaging slots are correspondingly engaged with the two positioning columns to position the battery box in the receiving cavity. When an external force in a reverse direction is applied to the battery box, the battery box rotates around the protruding rib as the rotation fulcrum in the reverse direction relative to the receiving cavity, so that the two engaging slots are disengaged from the two positioning columns to separate the battery box from the receiving cavity.

Further, the tube body is arranged obliquely. The two fixed bases are arranged up and down. The two fixed bases are removably and fixedly installed in the inner cavity of the tube body, respectively.

The transverse cross section of the access opening has an inverted L shape. Based on a travel direction of the electric bicycle as a reference, the protruding rib is integrally formed on the long side of the access opening on the lower left.

Further, a side of each of the bearing bases facing away from the box body is defined as an outer side.

The engaging slot is integrally formed on the outer side of each of the bearing bases. Each of the engaging slots is an arc-shaped slot. One end of each of the engaging slots in the arc length direction is integrally connected to an arc-shaped guide wall.

Further, a stop block is integrally provided on the outer side of each of the bearing bases.

When the battery box rotates around the protruding rib as the rotation fulcrum relative to the receiving cavity, each of the stop blocks separately abuts against one of the positioning columns matched with the stop block.

Further, a locking mechanism is installed on the down tube, and the battery box is locked to the down tube by the locking mechanism.

Further, the two fixed bases are defined as an upper fixed base and a lower fixed base, respectively. Correspondingly, the two bearing bases are defined as an upper bearing base and a lower bearing base, respectively.

The locking mechanism has a lock housing, a lock bolt, and a key. The lock housing is positioned and installed on the upper fixed base. The tube body is provided with a lock hole matched with the lock housing and the key. The lock bolt is elastically provided on a side of the lock housing facing the receiving cavity. An end of the lock bolt facing the receiving cavity is driven by the key to abut against and separate from the upper bearing base.

Further, a positioning slot is provided on a side of the upper bearing base facing the upper fixed base, and an end of the lock bolt facing the receiving cavity is driven by the key to abut against and separate from the positioning slot.

The advantages of the present invention are as follows. Compared with the prior art, the present invention improves the integrated relationship between the down tube of the electric bicycle and the battery box, so that the battery box can be placed in or removed from the receiving cavity by rotating parallel to the tube body (since the protruding rib extends along the lengthwise direction of the tube body, when the battery box rotates around the protruding rib as the rotation fulcrum relative to the receiving cavity, the battery box can be regarded as being parallel to the tube body). The above-mentioned integrated structure is not only novel in structure and unique in operation mode, but also greatly reduces the requirements for the structure and size of the down tube, which is conducive to production and processing. In addition, by virtue of the above-mentioned integrated relationship, the down tube and the battery box, after being installed, are integrated into a single unit, thereby improving the aesthetic appearance of the entire bicycle.

| | |
|---|---|
| 1-- down tube | 10-- tube body |
| 11-- fixed base | 12-- receiving cavity |
| 13-- protruding rib | 14-- positioning column |
| 15--lock hole | 2-- battery box |
| 20-- box body | 21-- bearing base |
| 22-- first dimple | 23-- second dimple |
| 24-- engaging slot | 25--guide wall |
| 26-- stop block | 27-- positioning slot |

DETAILED DESCRIPTION OF THE EMBODIMENTS

The preferred embodiments of the present invention will be described in detail below with reference to the drawings.

Embodiment 1

Figure 1:
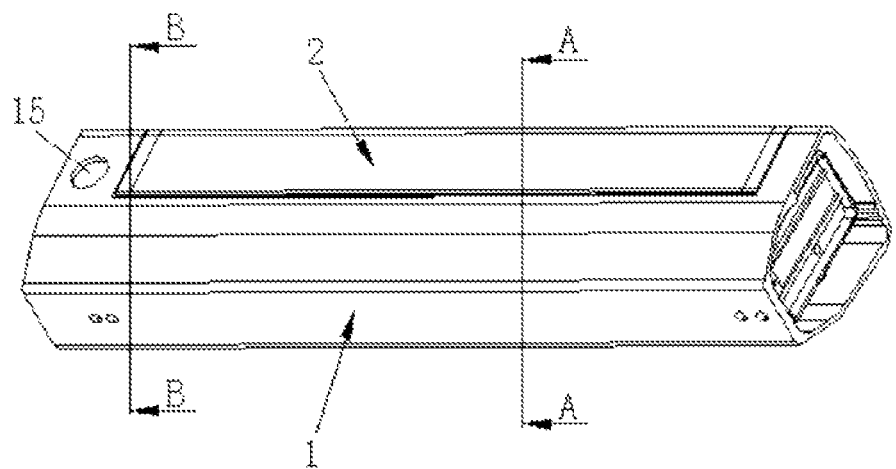
FIG. 1 is a perspective view of the structure integrating the down tube of the electric bicycle with the battery box according to the present invention.
Figure 4:
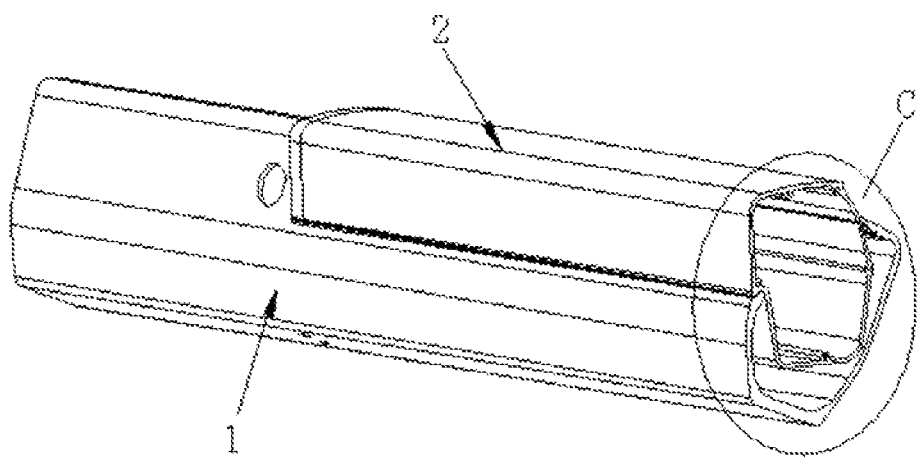
FIG. 4 is a schematic view of the cross section of the structure integrating the down tube of the electric bicycle with the battery box according to the present invention.
Figure 6:
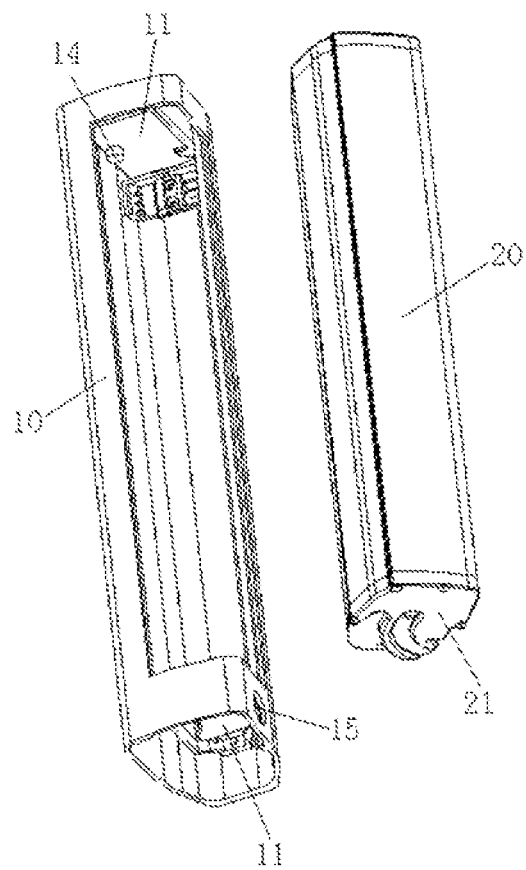
FIG. 6 is a schematic view of the structure with the down tube of the electric bicycle separated from the battery box according to the present invention.

Referring to FIG. 1, FIG. 4 and FIG. 6, in which FIG. 1 is a perspective view of the structure integrating the down tube of the electric bicycle with the battery box according to the present invention, FIG. 4 is a schematic view of the cross section of the structure integrating the down tube of the electric bicycle with the battery box according to the present invention, and FIG. 6 is a schematic view of the structure with the down tube of the electric bicycle separated from the battery box according to the present invention.

Figure 2:
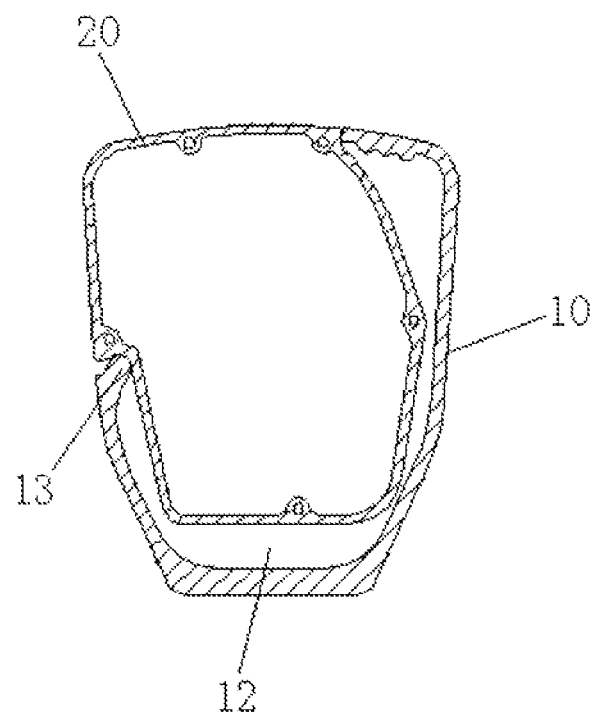
FIG. 2 is a cross-sectional view taken along arrow A-A in FIG. 1.
Figure 3:
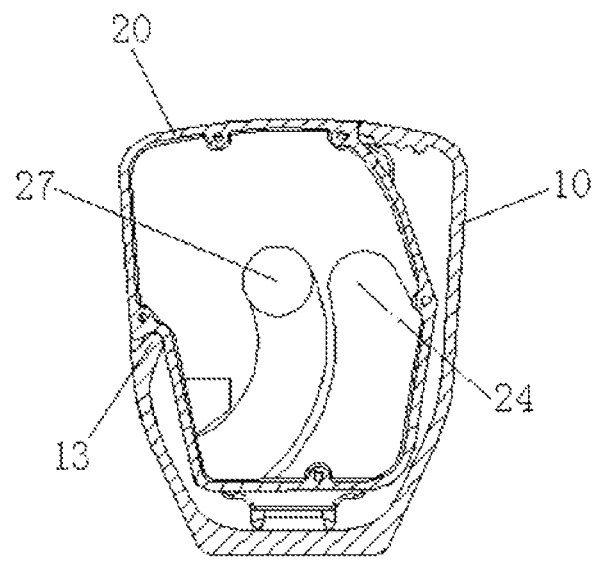
FIG. 3 is a cross-sectional view taken along arrow B-B in FIG. 1.
Figure 5:
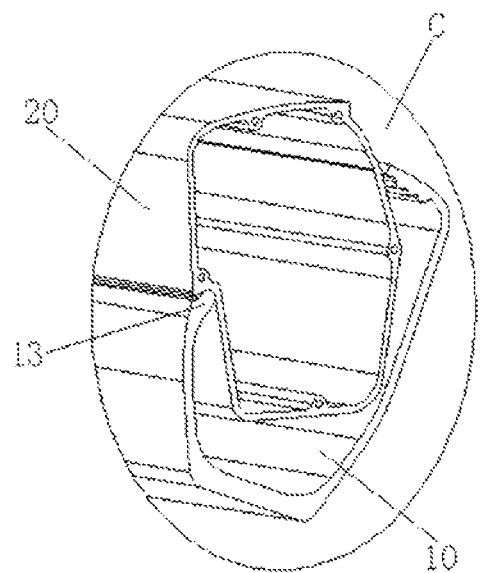
FIG. 5 is an enlarged view of the portion C encircled in FIG. 4.

A structure for integrating a down tube of an electric bicycle with a battery box includes the down tube 1 and the battery box 2. The down tube 1 has the hollow straight tubular tube body 10 and two fixed bases 11 arranged in the inner cavity of the tube body 10 at intervals along the lengthwise direction of the tube body 10. The receiving cavity 12 is bounded by the two fixed bases 11 and the inner cavity of the tube body 10. The receiving cavity 12 is provided with an access opening on the outer side surface of the tube body 10. The access opening extends along the lengthwise direction of the tube body 10, and is configured to allow the battery box 2 to be placed in the receiving cavity 12. A long side of the access opening extends inward to form the elongated protruding rib 13 (as shown in FIG. 2, FIG. 3 and FIG. 5). In addition, the positioning column 14 is integrally provided on each of two opposite sides of the two fixed bases 11.

Figure 7:
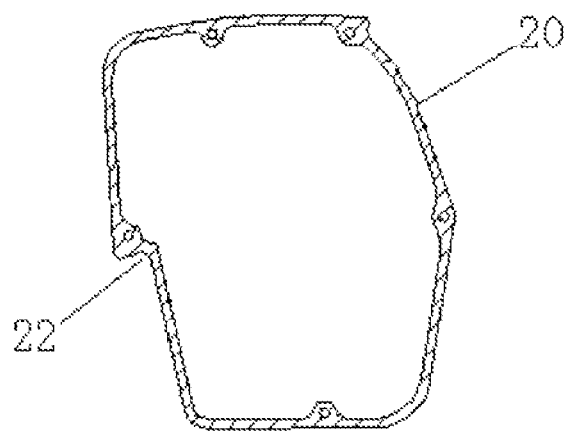
FIG. 7 is a cross-sectional view of the box body according to the present invention.
Figure 8:
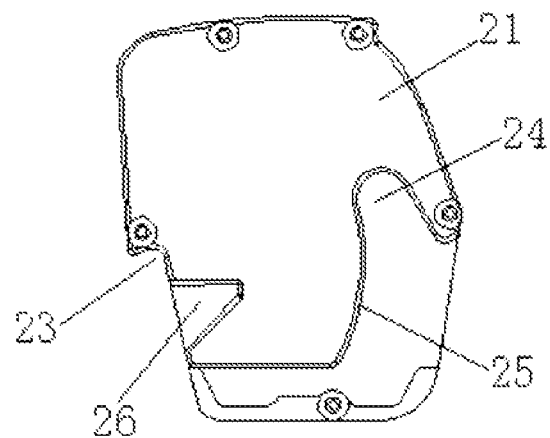
FIG. 8 is a cross-sectional view of one bearing base according to the present invention.
Figure 9:
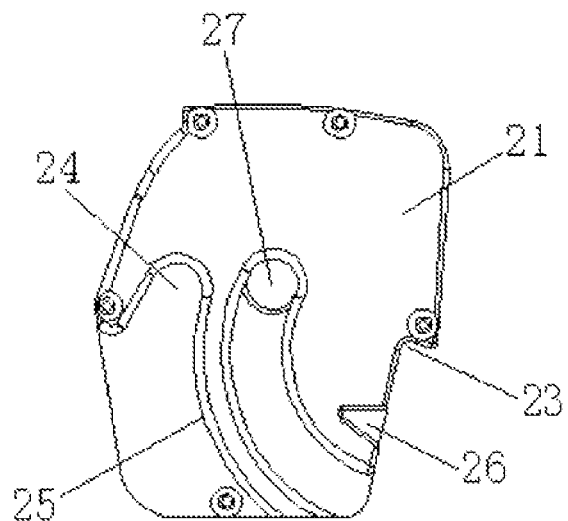
FIG. 9 is a cross-sectional view of the other bearing base according to the present invention.

The battery box 2 has the straight tubular box body 20 for receiving a battery cell and two bearing bases 21 that are positioned and installed on the outer sides of the two ends of the box body 20 in the lengthwise direction of the box body 20, respectively. The first dimple 22 (as shown in FIG. 7) is provided on the outer side of the box body 20 in a concave manner and extends along the lengthwise direction of the box body 20. The second dimple 23 (as shown in FIG. 8 and FIG. 9) is provided on one side of each of the bearing bases 21 in a concave manner. The two second dimples 23 are connected to the two ends of the first dimple 22 in the lengthwise direction of the first dimple 22 through smooth transitions, respectively, to jointly constitute a rotating slot movably matched with the protruding rib 13. In addition, the two bearing bases 21 correspondingly match the two fixed bases 11, respectively. The engaging slot 24 (as shown in FIG. 8 and FIG. 9) is integrally formed on each of the bearing bases 21 correspondingly, and is configured to be movably matched with the positioning column 14.

Figure 10:
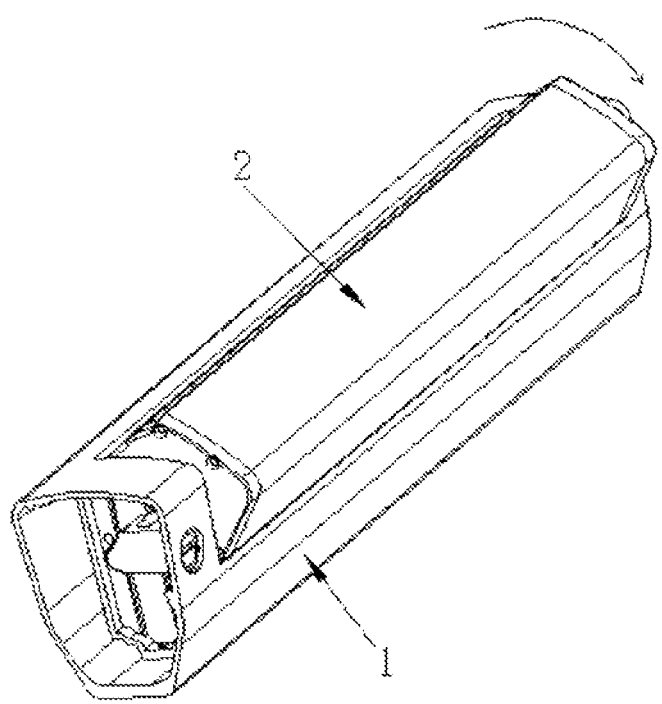
FIG. 10 is a schematic view of the rotation of the battery box relative to the down tube according to the present invention.

When an external force in a positive direction is applied to the battery box 2, the battery box 2 rotates around the protruding rib 13 as the rotation fulcrum (i.e., rotation pivot) in the positive direction (such as counterclockwise) relative to the receiving cavity 12, so that the two engaging slots 24 are correspondingly engaged with the two positioning columns 14 to position the battery box 2 in the receiving cavity 12. When an external force in a reverse direction is applied to the battery box 2, the battery box 2 rotates around the protruding rib 13 as the rotation fulcrum in the reverse direction (such as clockwise) relative to the receiving cavity 12, so that the two engaging slots 24 are disengaged from the two positioning columns 14 to separate the battery box 2 from the receiving cavity 12, as shown in FIG. 10.

In the present embodiment, preferably, the tube body 10 is arranged obliquely. The two fixed bases 11 are arranged up and down. The two fixed bases 11 are removably and fixedly installed in the inner cavity of the tube body 10 by fastening screws, respectively.

The transverse cross section of the access opening has an inverted L shape. Based on the travel direction of the electric bicycle (that is, the travel direction of the electric bicycle is the front-rear direction) as a reference, the protruding rib 13 is integrally formed on a long side of the access opening on the lower left.

In the present embodiment, preferably, a side of each of the bearing bases 21 facing away from the box body 20 is defined as an outer side.

The engaging slot 24 is integrally formed on the outer side of each of the bearing bases 21. Each of the engaging slots 24 is an arc-shaped slot. One end of each of the engaging slots 24 in the arc length direction is integrally connected to the arc-shaped guide wall 25 to facilitate the rotation of the battery box 2.

Further, preferably, the stop block 26 is integrally provided on the outer side of each of the bearing bases 21.

When the battery box 2 rotates around the protruding rib 13 as the rotation fulcrum relative to the receiving cavity 12, each of the stop blocks 26 separately abuts against one of the positioning columns 14 matched with the stop block 26 to limit the rotation of the battery box 2.

In the present embodiment, preferably, a locking mechanism is further installed on the down tube 1, and the battery box 2 is locked to the down tube 1 by the locking mechanism.

Further, preferably, the two fixed bases 11 are defined as an upper fixed base and a lower fixed base, respectively. Correspondingly, the two bearing bases 21 are defined as an upper bearing base and a lower bearing base, respectively.

The locking mechanism has a lock housing, a lock bolt, and a key. The lock housing is positioned and installed on the upper fixed base. The tube body 10 is provided with the lock hole 15 matched with the lock housing and the key. The lock bolt is elastically provided on a side of the lock housing facing the receiving cavity 12. The end of the lock bolt facing the receiving cavity 12 is driven by the key to abut against and separate from the upper bearing base. The combination of the lock housing, the lock bolt and the key can be implemented by a conventional tumbler lock, and thus will not be described in detail herein.

Furthermore, preferably, the positioning slot 27 is provided on a side of the upper bearing base facing the upper fixed base. The end of the lock bolt facing the receiving cavity 12 is driven by the key to abut against and separate from the positioning slot 27.

In summary, compared with the prior art, the present invention improves the integrated relationship between the down tube of the electric bicycle and the battery box, so that the battery box can be placed in or removed from the receiving cavity by rotating parallel to the tube body (since the protruding rib extends along the lengthwise direction of the tube body, when the battery box rotates around the protruding rib as the rotation fulcrum relative to the receiving cavity, the battery box can be regarded as being parallel to the tube body). The above-mentioned integrated structure is not only novel in structure and unique in operation mode, but also greatly reduces the requirements for the structure and size of the down tube, which is conducive to production and processing. In addition, by virtue of the above-mentioned integrated relationship, the down tube and the battery box, after being installed, are integrated into a single unit, thereby improving the aesthetic appearance of the entire bicycle.

The above descriptions are only the preferred embodiments of the present invention but do not limit the present invention. It should be pointed out that, for those of ordinary skill in the art, several improvements and modifications can be made without departing from the technical principle of the present invention, and these improvements and modifications shall also be regarded as falling within the scope of protection of the present invention.

What is claimed is:

1. A structure for integrating a down tube of an electric bicycle with a battery box, comprising
   the down tube and the battery box;
   wherein
   the down tube has a hollow straight tubular tube body and two fixed bases arranged in an inner cavity of the hollow straight tubular tube body at intervals along a lengthwise direction of the hollow straight tubular tube body;
   a receiving cavity is bounded by the two fixed bases and the inner cavity of the hollow straight tubular tube body;
   the receiving cavity is provided with an access opening on an outer side surface of the hollow straight tubular tube body;
   the access opening extends along the lengthwise direction of the hollow straight tubular tube body, and the access opening is configured to allow the battery box to be placed in the receiving cavity;
   a long side of the access opening extends inward to form an elongated protruding rib;
   a positioning column is integrally provided on each of two opposite sides of the two fixed bases;
   the battery box has a straight tubular box body for receiving a battery cell and two bearing bases;
   the two bearing bases are positioned and installed on outer sides of two ends of the straight tubular box body in a lengthwise direction of the straight tubular box body, respectively;
   a first dimple is provided on an outer side of the straight tubular box body in a concave manner and the first dimple extends along the lengthwise direction of the straight tubular box body;
   a second dimple is provided on one side of each of the two bearing bases in the concave manner;
   the two second dimples are connected to two ends of the first dimple in a lengthwise direction of the first dimple through smooth transitions, respectively, to jointly constitute a rotating slot movably matched with the elongated protruding rib;
   the two bearing bases correspondingly match the two fixed bases, respectively;
   an engaging slot is integrally formed on each of the two bearing bases correspondingly, and the engaging slot is configured to be movably matched with the positioning column;
   when an external force in a positive direction is applied to the battery box, the battery box rotates around the elongated protruding rib as a rotation fulcrum in the positive direction relative to the receiving cavity, and the two engaging slots are correspondingly engaged with the two positioning columns to position the battery box in the receiving cavity; and
   when an external force in a reverse direction is applied to the battery box, the battery box rotates around the elongated protruding rib as the rotation fulcrum in the reverse direction relative to the receiving cavity, and the two engaging slots are disengaged from the two positioning columns to separate the battery box from the receiving cavity.

2. The structure for integrating the down tube of the electric bicycle with the battery box according to claim 1, wherein
the hollow straight tubular tube body is arranged obliquely;
the two fixed bases are arranged up and down;
the two fixed bases are removably and fixedly installed in the inner cavity of the hollow straight tubular tube body, respectively;
a transverse cross section of the access opening has an inverted L shape; and
based on a travel direction of the electric bicycle as a reference, the elongated protruding rib is integrally formed on the long side of the access opening on a lower left.

3. The structure for integrating the down tube of the electric bicycle with the battery box according to claim 2, wherein
a locking mechanism is installed on the down tube, and the battery box is locked to the down tube by the locking mechanism.

4. The structure for integrating the down tube of the electric bicycle with the battery box according to claim 3, wherein
the two fixed bases are defined as an upper fixed base and a lower fixed base, respectively, and the two bearing bases are correspondingly defined as an upper bearing base and a lower bearing base, respectively;
the locking mechanism has a lock housing, a lock bolt, and a key;
wherein
the lock housing is positioned and installed on the upper fixed base;
the hollow straight tubular tube body is provided with a lock hole matched with the lock housing and the key;
the lock bolt is elastically provided on a side of the lock housing facing the receiving cavity; and
an end of the lock bolt facing the receiving cavity is driven by the key to abut against and separate from the upper bearing base.

5. The structure for integrating the down tube of the electric bicycle with the battery box according to claim 4, wherein
a positioning slot is provided on a side of the upper bearing base facing the upper fixed base, and
an end of the lock bolt facing the receiving cavity is driven by the key to abut against and separate from the positioning slot.

6. The structure for integrating the down tube of the electric bicycle with the battery box according to claim 1, wherein
a side of each of the two bearing bases facing away from the straight tubular box body is defined as an outer side;
the engaging slot is integrally formed on the outer side of each of the two bearing bases;
each of the two engaging slots is an arc-shaped slot; and
one end of each of the two engaging slots in an arc length direction is integrally connected to an arc-shaped guide wall.

7. The structure for integrating the down tube of the electric bicycle with the battery box according to claim 6, wherein
a stop block is integrally provided on the outer side of each of the two bearing bases; and
when the battery box rotates around the elongated protruding rib as the rotation fulcrum relative to the receiving cavity, each of the stop blocks separately abuts against one of the two positioning columns matched with the stop blocks.

* * * * *